May 31, 1932.  A. NUTT  1,860,813
LUBRICATION SYSTEM FOR INVERTED MOTORS
Filed June 3, 1926
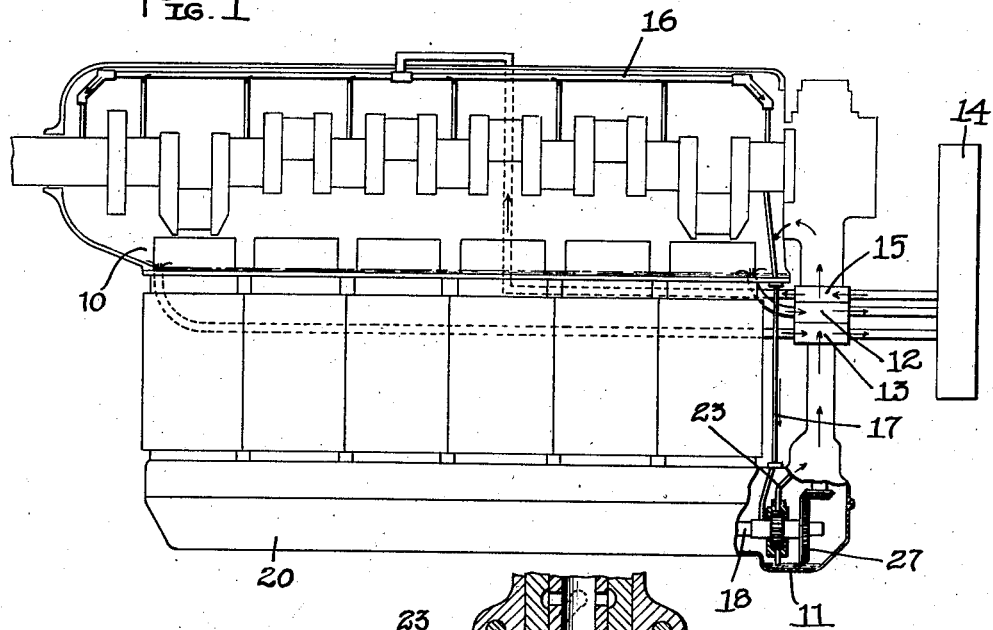
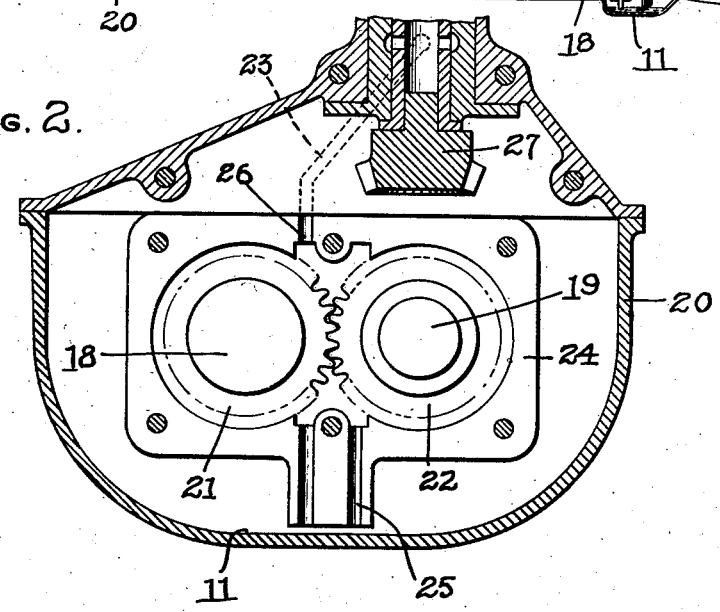
INVENTOR
ARTHUR NUTT
BY
ATTORNEY Patented May 31, 1932

1,860,813

UNITED STATES PATENT OFFICE

ARTHUR NUTT, OF KENMORE, NEW YORK, ASSIGNOR TO CURTISS AEROPLANE & MOTOR CO., INC., A CORPORATION OF NEW YORK

LUBRICATION SYSTEM FOR INVERTED MOTORS

Application filed June 3, 1926. Serial No. 113,442.

My invention relates to motors for aircraft and more particularly to the lubrication of such motors.

Strange as it may seem, it has been found by actual test, that certain advantages result both with respect to the operation of the motor and in the performance of the aeroplane, if and when the motor is installed in an inverted or up-side-down position. Perhaps the greatest advantage attributable to this installation is the marked increase in forward visibility which not only simplifies the landing problem but greatly facilitates manœuvering in combat. A further advantage lies in the simplification of the fuel system which can be operated by gravity. Also, improved motor accessibility, increased propeller ground clearance, simplicity of motor cowling, etc., are still further advantages resulting from the inverted position of the motor.

To invert an aeronautical motor, however, certain modifications and changes in the lubrication system of the motor are necessary. In the ordinary system of motor lubrication the lower half of the motor crank case constitutes a drainage reservoir into which all of the used oil exuding from the motor parts requiring lubrication drains. As said drainage reservoir is located beneath said motor parts gravity alone is sufficient to convey the used oil thereinto. In an inverted motor, as distinguished from said ordinary lubrication system, it is impossible to provide a single drainage reservoir into which all of the used oil is free to gravitate. What was formerly the upper crank case half becomes, in an inverted motor, the lower half. This half of the crank case while designed to catch and collect a substantial portion of the used oil, does not constitute the sole and only collecting chamber or drainage reservoir. The cam shaft housing (or the cam shaft housings in a V type motor) provide, in the inverted motor a second or auxiliary drainage reservoir. Into such auxiliary drainage reservoir the used oil escaping from the cam shaft bearings drains. This oil, if allowed to accumulate, would very quickly completely fill the cam shaft housing and would, at the same time, thereafter prevent the free and unobstructed circulation of the oil.

The object of the present invention is to provide, in an inverted motor, an auxiliary scavenging oil pump of a construction such that the oil collecting in the cam shaft housing, and as fast as it accumulates, is withdrawn therefrom and delivered under pressure either to the primary reservoir formed by the crank case or to the oil supply reservoir which may or may not be made an integral part of the motor. Preferably such auxiliary scavenging oil pump is located at one end of the cam shaft housing and is of the gear type, one of the cam shaft driving gears serving also as a pump gear in the accomplishment of the desired result.

In the drawings, wherein like reference characters denote like or corresponding parts.

Fig. 1 is a diagrammatic illustration of an inverted aeronautical motor showing the oil circuit in part; the arrows indicating the direction of the flow of oil, and Fig. 2 is a longitudinal substantially vertical sectional view of that portion of the cam shaft driving mechanism in the vicinity of the cam shaft gears, one face of the pump casing within which said gears are enclosed, being removed.

In the embodiment of the invention selected for illustration, the lubrication system for the inverted motor is shown as comprising a primary drainage reservoir 10 and a secondary drainage reservoir 11. The primary drainage reservoir 10 is formed by the lower half of the crank case of the motor. At each end of said drainage reservoir the oil draining or dripping from the crank shaft bearings is withdrawn. For this purpose two scavenging oil pumps 12 and 13 are provided. Said pumps 12 and 13 deliver the oil thus drawn to an outside supply tank or reservoir 14. From said reservoir 14 the oil is withdrawn by means of a pressure or delivery pump 15 and delivered to the various parts of the motor requiring lubrication. The distributing conduit by which such delivery is made is designated as 16. At one end of said conduit 16 an oil duct 17 is provided. This duct is adapted to convey the oil under pressure to the cam shafts 18 and 19 which are hollow and from the hollow cam shafts the oil oozes out onto the cam shaft bearings and drips to the bottom of the cam shaft housing 20. Ordinarily the cam shaft housing is mounted at the top of the motor. In an inverted motor, that which is ordinarily the top, becomes the bottom, consequently the oil entering the cam shaft housing must remain therein unless some means be provided to pump it back again either directly into the supply tank 14 or into the primary drainage reservoir formed by the bottom half of the crank case. In the present invention the two driving gears 21 and 22 for the cam shafts 18 and 19 constitute a gear pump for withdrawing the oil from the cam shaft housing and delivering it thru a conduit 23 back again to the primary drainage reservoir 10.

In Fig. 2 of the drawings the detail construction of the scavenging oil pump for withdrawing the oil from the cam shaft housing 11 is shown. Such pump comprises in addition to the gears 21 and 22 a suitable casing 24 having a suction inlet 25 formed therein at the base of the pump and so disposed in its relation to the cam shaft housing as to remove from the lowest point thereof the oil accumulating therein. As the oil is withdrawn from the cam shaft housing by the gears 21 and 22 it is delivered under pressure to the pump outlet duct 26 and from such duct it enters the return duct 23 by means of which it is ultimately delivered back again to the crank case as shown by the arrow lines of Fig. 1. The combination cam shaft driving and pump gears 21 and 22 are driven off the crank shaft in the usual manner as by suitable shaft and gearing, two intermeshing beveled gears of which are designated respectively as 27 and 27'.

A lubrication system thus characterized is advantageous in that an accumulation of oil in either drainage reservoir is prevented. By enclosing the gears 21 and 22 in a suitable casing as previously described, said gears 21 and 22 serve a two-fold purpose. They function both as driving gears for the parallel cam shafts 18 and 19 and they function also as pump gears for removing the oil from the drainage reservoir 11. Being thus characterized, the necessity for adding gears in addition to the driving gears 21 and 22 for the purpose of providing a pump within the cam shaft housing is avoided. Preferably the scavenging oil pump formed by said gears 21 and 22 has a pumping capacity sufficient to maintain the drainage reservoir 11 substantially dry. In other respects, the lubrication system follows the operation of the more or less conventional lubrication system characteristic of "Curtiss" motors.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A lubrication system for traveling motors having cylinders including a primary drainage reservoir arranged to receive oil draining from the crank shaft bearings of the motor, a secondary drainage reservoir mounted opposite the motor cylinders from the primary drainage reservoir and arranged to independently receive oil draining from the cam shaft bearings of the motor, said two drainage reservoirs being so relatively arranged that the oil therein contained cannot flow by gravity from one to the other thereof as the angle of inclination of the motor changes in operation, a supply reservoir, a scavenging oil pump operable to withdraw oil from said secondary drainage reservoir and to deliver it to said primary drainage reservoir, a scavenging oil pump operable to withdraw oil from said primary drainage reservoir, and to deliver it to said supply reservoir, and a delivery oil pump operable to withdraw oil from said supply reservoir and to deliver it to both the crank shaft and the cam shaft bearings.

2. In a lubrication system for traveling motors, the combination with the motor crank shaft, of crank shaft bearings, a drainage reservoir arranged to receive oil drainage from the crank shaft bearings, a motor cam shaft, cam shaft bearings, a drainage reservoir arranged to receive oil draining from the cam shaft bearings, a supply reservoir, and driving mechanism for the motor cam shaft including a cam shaft driving gear operable also as an oil pump gear to withdraw and deliver the oil contained in said cam shaft bearings drainage reservoir to said crank shaft bearings drainage reservoir.

3. In a lubrication system for traveling motors, the combination with the motor crank shaft and the motor cam shaft, of a drainage reservoir arranged to receive oil draining from the crank shaft bearing, a second drainage reservoir arranged to receive oil draining from the cam shaft bearings, a supply reservoir, driving mechanism for the motor cam shaft including a cam shaft driving gear operable also as an oil pump gear to withdraw and deliver the oil contained in said second drainage reservoir to said first mentioned reservoir, a scavenging oil pump operable to withdraw oil from said first mentioned drainage reservoir and to deliver it to said supply reservoir, and a delivery oil pump operable to withdraw oil from said supply reservoir and to deliver it to both the cam shaft and the crank shaft bearings.

4. In a lubrication system for traveling motors, the combination with the motor crank shaft and the motor cam shaft of a drainage reservoir arranged to receive oil draining from the crank shaft bearings, a second drainage reservoir disposed beneath said first mentioned drainage reservoir and arranged to receive oil draining from the cam shaft bearings, a supply reservoir, driving mechanism for the motor cam shaft including a cam shaft driving gear operable also as an oil pump gear to withdraw and deliver the oil contained in said second drainage reservoir to said first mentioned drainage reservoir, a scavenging oil pump operable to withdraw the oil contained in said first mentioned drainage reservoir to deliver it to said supply reservoir, and a delivery oil pump operable to withdraw oil from said supply reservoir and to deliver it to both the crank shaft and the cam shaft bearings.

5. In a lubrication system for traveling motors, the combination with a pair of cam shafts arranged in parallelism, of cam shaft bearings therefor, a drainage reservoir arranged to receive oil draining from the cam shaft bearings, a supply reservoir, driving mechanism for one of the cam shafts including a pair of meshing gears mounted, one on each said cam shaft and operable also as oil pump gears to withdraw the oil contained in said drainage reservoir, said oil being ultimately delivered to said supply reservoir, and a delivery oil pump operable to withdraw oil from said supply reservoir and to deliver it to the cam shaft bearings.

6. In a lubrication system for travelling motors, the combination with the motor crank shaft and the motor cam shaft, of a drainage reservoir arranged to receive oil draining from the crank shaft bearings, a second drainage reservoir arranged to receive oil draining from the cam shaft bearings, a supply reservoir, driving mechanism for the cam shaft including a cam shaft driving gear operable also as an oil pump gear to withdraw the oil contained in said second mentioned drainage reservoir, a scavenging oil pump operable to withdraw the oil contained in said first mentioned drainage reservoir, the oil withdrawn from both said drainage reservoirs being ultimately delivered to said supply reservoir and a delivery oil pump operable to withdraw oil from said supply reservoir and to deliver it to both the cam shaft and the crank shaft bearings.

7. In a lubrication system for traveling motors, the combination with two parallel motor cam shafts, of a drainage reservoir arranged to receive oil draining from the cam shaft bearings, a supply reservoir, driving mechanism for the motor cam shafts including two meshing cam shaft driving gears operable also as oil pump gears to withdraw the oil contained in said drainage reservoir for ultimate delivery to said supply reservoir, and a delivery oil pump operable to withdraw oil from said supply reservoir and to deliver it to the cam shaft bearings.

8. In a lubrication system for traveling motors, the combination, of a motor cylinder, a crank shaft mounted adjacent to one end of said cylinder, a cam shaft mounted adjacent to the opposite end of said cylinder, a drainage reservoir arranged to receive oil draining from the crank shaft bearings, a secondary drainage reservoir arranged to receive oil draining from the cam shaft bearings, said two drainage reservoirs being so relatively arranged that the oil therein contained cannot flow by gravity from one to the other thereof as the angle of inclination of the motor changes in operation, a supply reservoir, a scavenging oil pump operable to withdraw the oil contained in said second mentioned reservoir, a scavenging oil pump operable to withdraw the oil contained in said first mentioned drainage reservoir, the oil withdrawn from both said drainage reservoirs being ultimately delivered to said supply reservoir and a delivery oil pump operable to withdraw oil from said supply reservoir and to deliver it to both the cam shaft and the crank shaft bearings.

9. In a lubrication system for traveling motors, the combination with a motor crank shaft and a motor cam shaft, of means comprising a drainage reservoir for receiving oil draining from the crank shaft bearings, means comprising a second drainage reservoir for receiving only oil draining from the cam shaft bearings, a supply reservoir, means for withdrawing and delivering the oil from the second drainage reservoir to said first mentioned drainage reservoir, means for withdrawing oil from said first mentioned drainage reservoir, and means for withdrawing oil from said supply reservoir and delivering it to both the cam shaft bearings and the crank shaft bearings.

10. In a lubrication system for traveling motors, the combination with a motor crank shaft and a motor cam shaft, of means comprising a drainage reservoir for receiving oil draining from the crank shaft bearings, means comprising a second drainage reservoir for receiving only oil draining from the cam shaft bearings, a supply reservoir, means comprising a scavenging oil pump for withdrawing and delivering oil contained in said second drainage reservoir to said first mentioned drainage reservoir, means comprising a second scavenging oil pump for withdrawing oil from said first mentioned drainage reservoir and for delivering it to said supply reservoir, and means comprising a delivery oil pump for withdrawing oil from said supply reservoir and delivering it to both the cam shaft bearings and the crank shaft bearings.

11. In a lubrication system for traveling motors, the combination of a motor crank shaft, two parallel motor cam shafts, a drainage reservoir arranged to receive oil draining from the crank shaft bearings, a second drainage reservoir arranged to receive oil draining from the bearings of the cam shafts, a supply reservoir, driving mechanism for one of the cam shafts, means including two intermeshing cam shaft gears for driving the second cam shaft from the first-mentioned cam shaft, the said two intermeshing gears being operable also as oil pump gears to withdraw oil contained in said second mentioned drainage reservoir and to deliver the said oil to said first mentioned drainage reservoir, a scavenging oil pump operable to withdraw oil from said first mentioned drainage reservoir and to deliver it to said supply reservoir, and a delivery oil pump operable to withdraw oil through said supply reservoir and to deliver it to both the cam shaft and the crank shaft bearings.

12. In a lubrication system for an inverted traveling motor, the combination with a motor cam shaft disposed beneath the cylinders of said motor, of cam shaft bearings, a drainage reservoir arranged to receive oil draining from the cam shaft bearings, driving mechanism for the cam shaft, and a scavenging pump driven directly from the cam shaft for withdrawing the oil contained in said drainage reservoir.

13. In a lubrication system for an inverted in-line traveling motor, in combination, a crank shaft disposed above the cylinders of said motor, a cam shaft disposed below said cylinders, a drainage reservoir for receiving the oil draining from the crank shaft and cam shaft bearings, driving mechanism between said crank shaft and said cam shaft and a scavenging pump driven directly from said cam shaft for withdrawing oil from said reservoir.

14. In a lubrication system for an inverted in-line traveling motor, in combination, a crank shaft disposed above the cylinders of said motor, a cam shaft disposed below said cylinders, a pressure oil pump for supplying oil to the crank shaft and cam shaft bearings, a drainage reservoir for receiving the oil draining from the crank shaft and cam shaft bearings, driving mechanism between said crank shaft and said cam shaft including a substantially vertical drive shaft having gears thereon meshing with cooperating gears on the crank shaft and cam shaft, respectively, and a scavenging pump driven directly from said cam shaft for withdrawing the oil from said reservoir.

In testimony whereof I hereunto affix my signature.

ARTHUR NUTT.